A: CYCLIZATION
B: DEHYDROGENATION
C: ISOMERIZATION

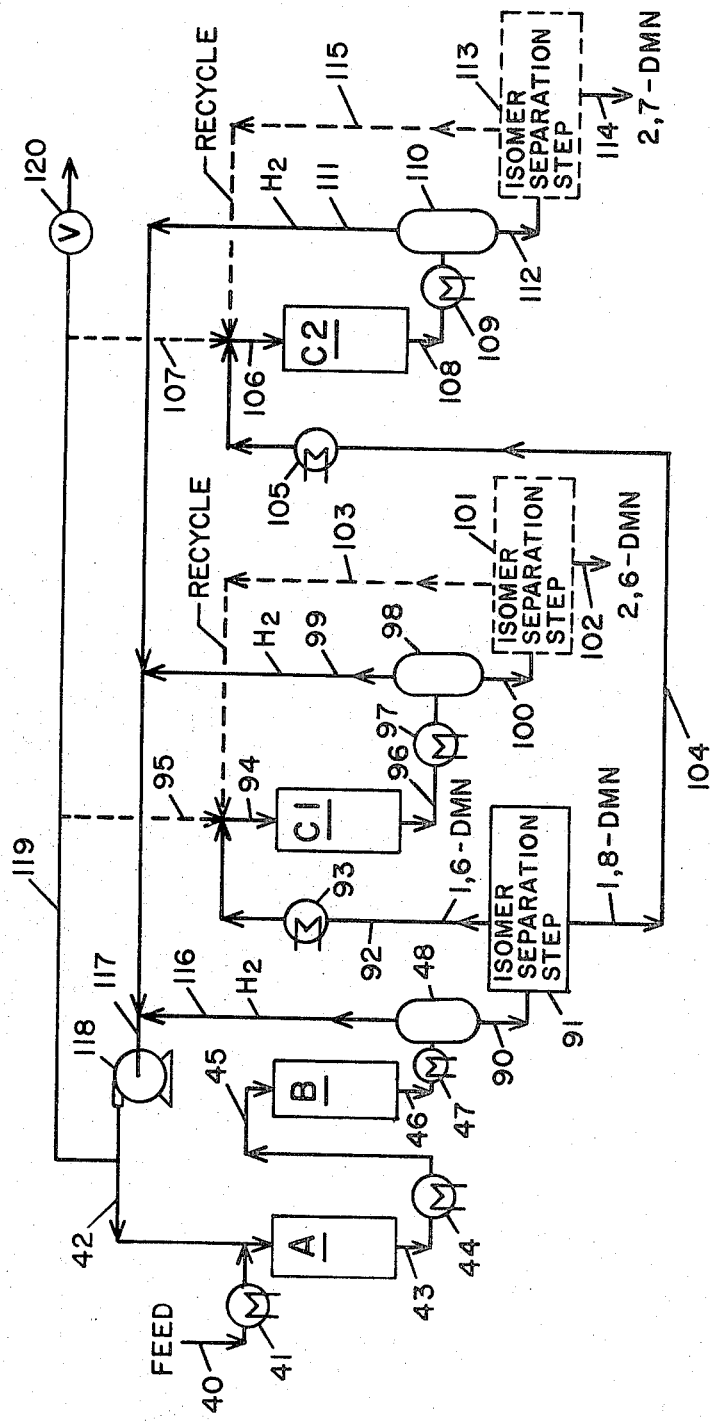

United States Patent Office 3,775,496
Patented Nov. 27, 1973

3,775,496
PREPARATION OF 2,6-DIMETHYLNAPHTHALENE
AND 2,7-DIMETHYLNAPHTHALENE
Sheldon L. Thompson, Glen Mills, Pa., assignor to Sun Research and Development Co., Marcus Hook, Pa.
Filed Aug. 9, 1972, Ser. No. 278,898
Int. Cl. C07c 15/24
U.S. Cl. 260—668 F    27 Claims

ABSTRACT OF THE DISCLOSURE

A multistep process is disclosed wherein 5-m-tolylpentene-2 is converted to 1,6- and 1,8-dimethyltetralin in the presence of a solid acidic catalyst at 200–450° C. and preferably also recycled hydrogen, vapors from this conversion are reacted by contact at 300–500° C. in a hydrogen atmosphere with a solid dehydrogenation catalyst, preferably platinum on non-acidic alumina, to form 1,6- and 1,8-dimethylnaphthalenes and hydrogen, vapors from the dehydrogenation reaction are contacted at 275–500° C. with a solid acidic isomerization catalyst to form 2,6- and 2,7 - dimethylnaphthalenes in admixture with other isomers, the 2,6- and 2,7-dimethylnaphthalenes are recovered from the isomerization product, e.g. by crystallization, and part of the generated hydrogen is recycled in the system. The process can be varied in several ways, including the utilization of a liquid acidic catalyst in either the first step or the isomerization step, and also subsequent to the dehydrogenation step by individually recovering the 1,6- and 1,8-dimethylnaphthalene isomers and separately isomerizing each isomer to form the 2,6- and 2,7-isomers respectively.

CROSS-REFERENCES TO RELATED APPLICATIONS

My copending U.S. application Ser. No. 263,731, filed June 9, 1972, relates to the preparation of 2,6-dimethylnaphthalene from 5-o-tolylpentene-2 in a combination process wherein the steps are generally analogous to those in the process of the present invention.

My copending U.S. application Ser. No. 278,897, filed Aug. 9, 1972, and entitled, "Preparation of 2,7-Dimethylnaphthalene" relates to the conversion of 5-p-tolylpentene-2 to the 2,7-isomer of dimethylnaphthalene in an analogous series of steps.

My copending U.S. application Ser. No. 278,899, filed Aug. 9, 1972, entitled "Preparation of 2,3 - Dimethylnaphthalene," relates to the use of an analogous series of steps for converting 5-phenylhexene-2 to 2,3-dimethylnaphthalene.

U.S. application Ser. No. 207,870, filed Dec. 14, 1971, by J. A. Hedge describes the use of crystalline zeolite catalysts, which preferably are of the faujasite cage structure and preferably contain rare earth components incorporated by ion exchange, for hydroisomerization of dimethylnaphthalenes (DMN's).

U.S. application Ser. No. 208,001, filed Dec. 14, 1971, by G. Suld and R. L. Urban, likewise discloses the hydroisomerization of DMN's employing a calcium-containing crystalline zeolite catalyst preferably of the faujasite cage structure.

BACKGROUND OF THE INVENTION

This invention relates to the conversion of 5-m-tolylpentene-2 to 2,6-dimethylnaphthalene and 2,7-dimethylnaphthalene. The invention particularly concerns a multistep process wherein 5-m-tolylpentene-2 is first converted to a mixture of 1,6- and 1,8-dimethyltetralins, the mixture is dehydrogenated to yield 1,6-dimethylnaphthalene (hereinafter referred to as 1,6-DMN) and 1,8-dimethylnaphthalene (1,8-DMN) and these compounds are then isomerized respectively to 2,6-dimethylnaphthalene (2,6-DMN) and 2,7-dimethylnaphthalene (2,7-DMN).

The use of various dimethylnaphthalenes (DMN's) to make corresponding naphthalene dicarboxylic acids having utility in the preparation of polyester resins is known. This conversion can be effected by oxidizing the two methyl substituents by known procedures, such as those described in U. S. Pat. 3,293,223, issued Dec. 20, 1966, I. N. Duling. As shown in this patent the diacids derived from 2,6–DMN and 2,7–DMN are particularly useful for making polyester resins that can be employed in the manufacture of films and fibers. Resins derived from these DMN's can also be employed as coating materials in various applications.

A procedure for making 1,6–DMN employing butadiene and m-xylene has been described in Eberhardt U.S. Pat. 3,244,758, issued Apr. 5, 1966. In this procedure the reactants are interacted in the presence of an alkali metal catalyst under conditions that give mainly the one-to-one adduct, namely, 5-m-tolylpentene-2. Treatment of this product with an acidic alkylation catalyst is taught to effect ring closure and yield 1,6-dimethyltetralin. The latter is then dehydrogenated to produce 1,6–DMN using, for example, platinum-on-alumina as catalyst. See also J. Org. Chem., 30, 82–84 (1965), G. G. Eberhardt et al., for analogous reactions.

The isomerization reactions of various DMN's employing HF or HF–BF$_3$ as catalyst have been described by G. Suld et al., J. Org. Chem., 29, 2939–2946 (1964) and in Suld United States Patent 3,109,036, issued Oct. 29, 1963. These references show that isomerization of 1,6–DMN by means of these catalysts will produce 1,5–DMN and 2,6–DMN but no other isomers, while isomerization of 1,8–DMN produces only 2,7–DMN and 1,7–DMN.

U.S. Pat. 3,336,411, issued Aug. 15, 1967, A. L. Benham, discloses the use of silica-alumina or silica-alumina-zirconia catalysts in the presence of hydrogen at temperatures of 250–400° C. for the isomerization of mixed DMN's.

Selective crystallization has been used to separate DMN isomers from each other, although heretofore the 2,6-isomer usually has been the one selectively crystallized as illustrated by the following U.S. patents: M. E. Peterkin et al. 3,485,885, issued Dec. 23, 1969; J. A. Hedge 3,541,175, issued Nov. 17, 1970; and T. E. Skarada et al. 3,590,091, issued June 29, 1971. The recovery of both 2,6–DMN and 2,7–DMN individually by crystallization is described in J. A. Hedge et al. U.S. Pat. 3,594,436, issued July 20, 1971.

The separation of DMN isomers from each other by selective complexation with various compounds is disclosed in the following U.S. patents which issued May 23, 1972: R. I. Davis et al. 3,665,043 and 3,665,045; and K. A. Scott 3,665,044.

The prior art also discloses the selective separation of various DMN isomers from each other by selective adsorption on certain types of crystalline zeolites, as shown in U.S. Pat. 3,114,782, issued Dec. 17, 1963, R. N. Fleck et al., and U.S. Pat. 3,668,267, issued June 6, 1972, J. A. Hedge.

U.S. Pat. 3,243,469, issued Mar. 29, 1966, A. Schneider, teaches the use of a platinum-on-alumina catalyst for dehydrogenating dimethyldecalin to produce DMN; and U.S. Pat. 3,428,698, issued Feb. 18, 1969, H. J. Peterson, shows the use of this same kind of catalyst for dehydrogenating mixed dimethyltetralins to DMN's.

U.S. Pat. 3,255,268, issued June 7, 1966, G. Suld et al., and U.S. Pat. 3,325,551, issued June 13, 1967, G. Suld, both teach the preparation of non-acidic dehydrogenation catalysts by treating platinum-on-alumina with a solution of a basic salt such as lithium carbonate.

SUMMARY OF THE INVENTION

The present invention provides efficacious procedures for converting 5-m-tolylpentene-2 to 2,6–DMN and 2,7–DMN by a continuous multistep process involving sequential steps of cyclization, dehydrogenation and isomerization. The process utilizes hydrogen produced in the dehydrogenation step in at least one of the other steps and advantageously in both the dehydrogenation and isomerization steps.

In one aspect the invention provides a process which comprises:

(A) Passing a feed composed mainly of 5-m-tolylpentene-2 in vapor form over a solid acidic catalyst at a temperature in the range of 200–450° C. and a pressure of 0–500 p.s.i.g. to effect cyclization and form a mixture of 1,6-dimethyltetralin and 1,8-dimethyltetralin;

(B) Contacting the reaction product from Step (A) in vapor form with a solid dehydrogenation catalyst at a temperature in the range of 300–500° C., in the presence of hydrogen and at a pressure in the range of 0–500 p.s.i.g. to convert 1,6 - dimethyltetralin to 1,6 - dimethylnaphthalene and 1,8-dimethyltetralin to 1,8-dimethylnaphthalene by dehydrogenation;

(C) Contacting the resulting vapor mixture of dimethylnaphthalenes and hydrogen with a solid acidic isomerization catalyst at a temperature in the range of 275–500° C. and a pressure in the range of 0–500 p.s.i.g. to form a mixture of dimethylnaphthalenes including 2,6-dimethylnaphthalene and 2,7-dimethylnaphthalene;

(D) Separating hydrogen from the reaction product containing 2,6 - dimethylnaphthalene and 2,7-dimethylnaphthalene; and (E) Recycling separated hydrogen to a step in the process preceding Step (C), or in other words to either Step (A) or Step (B).

In another embodiment Step (A) is carried out with the feed in liquid phase employing either a liquid or solid acidic cyclizing catalyst, Steps (B), (C) and (D) are effected as above-described, and separated hydrogen is recycled back to Step (B).

In still another embodiment the dehydrogenation reaction product (1,6–DMN and 1,8–DMN) from Step (B) is condensed and separated from the associated hydrogen gas, the hydrogen is recycled to Step (A), and the 1,6–DMN and 1,8–DMN are isomerized in a subsequent step to form 2,6–DMN and 2,7–DMN. Optionally in this case the 1,6–DMN and 1,8–DMN first can be separated from each other and then isomerized individually.

In any of the embodiments the mixed DMN's from the isomerization step are treated to selectively remove the 2,6-DMN and 2,7-DMN and the other isomers preferably are recycled for further isomerization.

BRIEF DESCRIPTION OF THE DRAWINGS

The invention is described with reference to the accompanying drawings wherein:

FIG. 4 is a schematic flowsheet representing a modification of the process of FIG. 2 whereby 2,6-DMN and 2,7-DMN are produced as separate products.

DESCRIPTION

The 5-m-tolylpentene-2 feed for the present process can be obtained by the reaction of butadiene and m-xylene according to procedures described in the Eberhardt references above cited. This reaction tends to produce minor amounts of higher adducts in addition to the desired one-to-one adduct, 5-m-tolylpentene-2. The latter can be purified, if desired, by distillation before being utilized as feed for the present process.

Figure 1:
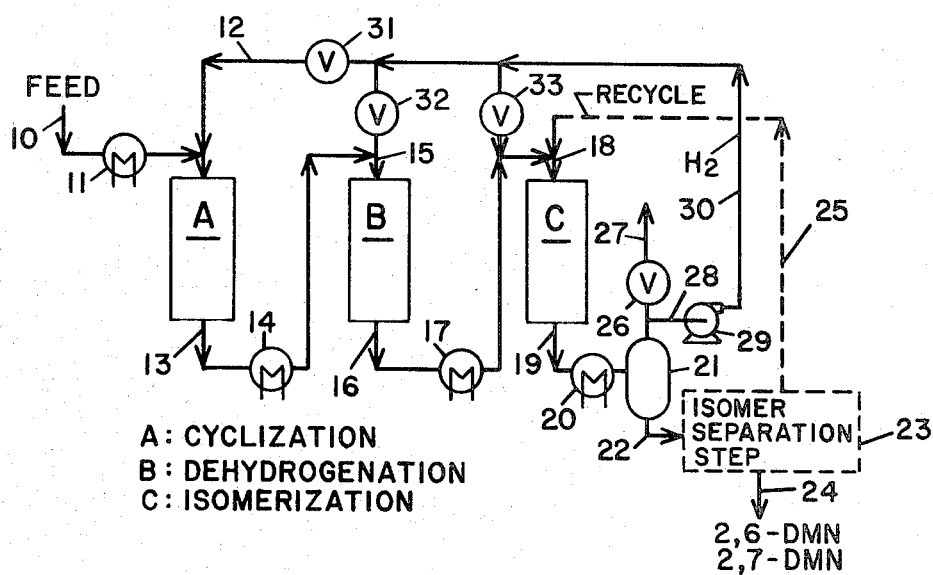
FIGS. 1 and 2 are schematic flowsheets illustrating different ways of practicing the process.

Referring now to FIG. 1, the 5-m-tolylpentene-2 feed enters through line 10 and, in one embodiment of the invention, is heated and vaporized in heater 11 and then enters reaction Zone A. This zone is provided with a solid acidic alkylation catalyst capable of causing cyclization or ring closure as shown in Equation I.

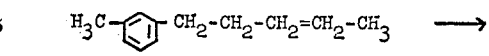

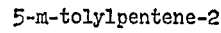

5-m-tolylpentene-2

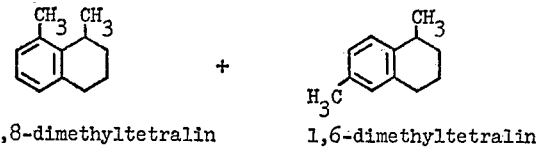

1,8-dimethyltetralin          1,6-dimethyltetralin

As shown in the equation closing of the olefinic substituent with the aromatic ring can occur in two directions, resulting in both the 1,6- and 1,8-dimethyltetralin isomers. The proportion of the two in the product can vary somewhat depending upon the catalyst and reaction conditions, but generally the 1,6-isomer content will be roughly twice as much as the 1,8-isomer content. The catalyst for this reaction can be any suitable solid acidic catalyst such as silica-alumina, silica-magnesia, silica-alumina-zirconia, acidic crystalline zeolites and the like. Solid phosphoric acid catalysts are particularly suitable for this reaction. This type of catalyst is commercially available and has been described, for example, in U.S. Pat. 2,585,899, issued Feb. 12, 1952, G. E. Langlois, and in U.S. Pat. 3,504,045, issued Mar. 31, 1970, E. J. Scharf et al. and patents cited therein.

The cyclization reaction in Zone A, depicted by Equation I, preferably is carried out in the presence of hydrogen which is admitted to the reactor through recycle line 12. Conditions for this reaction include temperatures in the range of 200–450° C. and pressures in the range of 0–500 p.s.i.g. The presence of the hydrogen is beneficial in that it tends to suppress the formation of high boiling by-products ($C_{24}$ dimer alkylate) and improve the selectivity of the reaction for obtaining the 1,6- and 1,8-dimethyltetralins.

Reaction products leave Zone A as a vapor through line 13 and are sent, without being condensed, to line 15 and into dehydrogenation Zone B. Reaction temperatures in this zone are in the range of 300–500° C. and generally higher than in Zone A. Accordingly a heater 14 connected with line 13 is provided to raise the temperature of the mixture of hydrogen and dimethyltetralins (typically 240° C. from Zone A) to the desired level for dehydrogenation (typically 430° C. average). Since this reaction is endothermic, means (not shown in FIG. 1) may be provided for supplying heat to the reactants in Zone B to prevent the temperature from dropping too low before the dehydrogenation reaction is completed.

A solid dehydrogenation catalyst is employed in Zone B to catalyze the reactions given by Equations II–a and II–b.

(II-a)

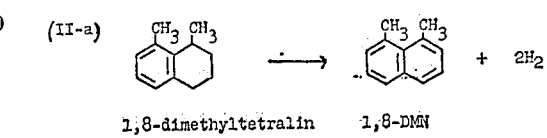

1,8-dimethyltetralin    1,8-DMN (II-b)

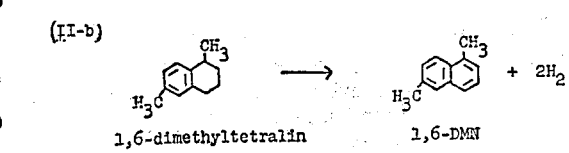

1,6-dimethyltetralin    1,6-DMN

As shown, the reaction produces two moles of hydrogen for each mole of reactant. This reaction thus serves as the source of supply of hydrogen used in Zone A, as well as that used in Zone C in the embodiment illustrated by FIG. 1. This reaction is carried out at a temperature level in the range of 300–500° C. and a pressure in the range of 0–500 p.s.i.g. Any solid dehydrogenation catalyst capable of effecting the dehydrogenation and exhibiting a reasonable life under these conditions can be used, including catalysts composed of noble metals on carriers such as reforming catalysts, chromia-alumina and the like. However it is preferable to use a platinum-on-alumina dehydrogenation catalyst and particularly platinum on non-acidic alumina, as this kind of catalyst will exhibit a particularly long life under the conditions employed in dehydrogenation Zone B.

The reaction in Zone B not only brings about the desired dehydrogenation but results in an unexpected benefit, in that any $C_{24}$ dimeric alkylation product which may have been formed in Zone A tends to be reconverted under the conditions of Zone B to $C_{12}$ material including dimethylnaphthalene.

In the embodiment of FIG. 1 the reaction mixture from dehydrogenation Zone B passes as a vapor through line 16 to line 18 and into isomerization Zone C where temperatures in the range of 275–500° C. and pressures of 0–500 p.s.i.g. are maintained. Since it is usually desirable to carry out the isomerization reaction at a temperature (typically 330° C.) lower than the average temperature of Zone B, means are provided, illustrated as heat exchanger 17, for regulating the temperature of the mixture of 1,6-DN, 1,8-DMN and hydrogen passing through line 16.

The catalyst employed in Zone C is a solid acidic isomerization catalyst and can be of the same types as described with respect to Zone A. Suitable acidic catalysts include silica-alumina or silica-alumina-zirconia as taught in U.S. Pat. 3,336,411 listed above and crystalline zeolite catalysts as described in aforesaid United States applications Ser. No. 207,870 and Ser. No. 208,001. Solid phosphoric acid catalysts as employed in the processes of aforesaid U.S. Pats. 2,585,899 and 3,504,045 likewise are suitable.

The reactions in Zone C cause the 1,6-DMN to isomerize to only two of its isomers and the 1,8-DMN to isomerize to two other isomers only, since a shift of a methyl substituent cannot occur between a 2-position and a 3-position or from one ring to the other on the naphthalene nucleus, as disclosed in aforesaid United States Patent 3,109,036. The shifts that can occur in the isomerization of 1,6-DMN are illustrated by Equation III-a.

(III-a) 

Thus the only isomers produced from the 1,6-DMN are 1,5-DMN and the desired 2,6-DMN. At equilibrium for this reaction at a temperature level of 330° C., the 1,5-isomer will be present only in minor amount of the order of 10%; and the 1,6- and 2,6-isomers will constitute most of the remainder, being present in roughly equal proportions.

The shifts that can occur as 1,8-DMN isomerizes in Zone C are illustrated by Equation III-b.

(III-b) 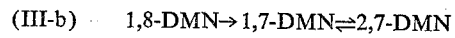

This equation shows that only 1,7-DMN and the desired 2,7-DMN are produced from the 1,8-isomer. At equilibrium for this reaction, the 1,8-DMN is so unfavored that essentially none remains; and the equilibrium product for a temperature level of 330° C. will be composed essentially of 2,7-DMN and 1,7-DMN in a proportion of about 55:45.

A small amount of disproportionation and other reactions also may occur during these isomerization reactions, resulting in the formation of, for example, a total of 5–10% of monomethyl- and trimethylnaphthalenes, say 1–3% of $C_{24}$ dimers of DMN's and possibly a small amount of DMN's having both methyl substituents on the same ring. If desired, these various by-products can be separated from the DMN's by subjecting the product from Zone C to fractional distillation (not shown) before the mixed DMN's are further processed.

The product from Zone C thus is mainly a mixture of five DMN isomers including the two desired as products, i.e. 2,6-DMN and 2,7-DMN. A typical composition is shown below, based on the assumptions that the ratio of 1,6-DMN to 1,8-DMN in the product from Zone B is 2:1, that each of these isomerizes in Zone C to give approximately the equilibrium product at 330° C., and that by-product formation is negligible. The isomers are listed in a decreasing order of their individual melting points.

|  | Percent | M.P., ° C. |
| --- | --- | --- |
| 2,6-DMN | 30 | 112 |
| 2,7-DMN | 18 | 98 |
| 1,5-DMN | 7 | 82 |
| 1,7-DMN | 15 | −13 |
| 1,6-DMN | 30 | −14 |

This tabulation shows that the two desired isomers fortunately will solidify at higher temperatures than the others and can be recovered by selective crystallization.

In the simplified illustration of the process in FIG. 1, distillation means for removing by-products lower and higher boiling than the DMN's are not illustrated and the isomerization product from Zone C is shown as passing through line 19 and condenser 20 to gas-liquid separator 21. Condenser 20 is operated so as to liquefy the isomer products without reducing temperature enough to cause any crystallization. The liquid product is removed from separator 21 through line 22 and sent to an isomer separation step illustrated schematically at 23. This separation can be done in any suitable manner, such as by crystallization, adsorption or selective complexation, so as to selectively recover both 2,6-DMN and 2,7-DMN from the other isomers. A mixture of the 2,6-DMN and 2,7-DMN is removed via line 24; and if desired, the two isomers can thereafter be separated from each other, for example, by the procedure described in aforesaid United States Patent 3,594,436. The other isomers optionally can be recycled, as indicated by dashed line 25, for further conversion to 2,6-DMN and 2,7-DMN in Zone C.

The gas phase, composed principally of hydrogen, is removed from the top of separator 21 and partly vented from the system through valve 26 and line 27. The rest of the hydrogen flows through line 28 to compressor 29 where it is recompressed for reuse in the system. The pressurized hydrogen is then recycled through line 30 back to a step preceding Zone C. Preferably the hydrogen is sent through valve 31 and line 12 back to Zone A for reuse in each of Zones A, B and C. However, the process can also be operated by closing valve 31, opening valve 32 and recycling the hydrogen from line 30 through line 15 to Zone B. Also part of the hydrogen from line 30 optionally can be recycled through valve 33 and line 18 into Zone C. This will permit adjustment of the hydrogen to hydrocarbon ratio in Zone C independently of such ratio in the effluent from Zone B and allow maintenance of a selected ratio regardless of variations in the amount of DMN's recycled through dashed line 25.

By operating the process as described for FIG. 1, no condensers and separators are needed between Zones A, B and C and only the single compressor 29 is required for supplying hydrogen to each of the three zones at the pressures at which they are operated. The arrangement thus minimizes plant investment and operating costs.

The process of FIG. 1 can be varied by carrying out the cyclization in Zone A by a liquid phase reaction, in which case the feed from line 10 is heated to the selected cyclization temperature in heater 11 but not vaporized. Suitable conditions for such liquid phase reaction employing a solid phosphoric acid catalyst include a temperature of 200–275° C., LHSV of 0.1–5 and preferably 0.3–2, and whatever pressure is needed to maintain the hydrocarbons as a liquid. Another suitable type of catalyst for liquid phase cyclization comprises acidic ion exchange resins, in which case reaction temperatures in the range of 70–140° C., preferably 110–125° C., should be employed. The liquid phase cyclization reaction can also be carried out by means of other types of catalysts such as acidic crystalline zeolites, siliceous cracking catalysts or liquid catalysts such as hydrofluoric or sulfuric acid. When a liquid catalyst is used, the temperature for effecting the cyclizing reaction can be relatively low, e.g. 0–100° C. The liquid reaction product in any of these cases is then vaporized in heater 14 and dehydrogenated in Zone B as previously described. In this embodiment valve 31 is closed and the hydrogen is recycled through valve 32 and line 15 to Zone B.

Regardless of whether the cyclization reaction in Zone A is carried out in vapor or liquid phase, the resulting dimethyltetralin product generally is associated with an appreciable amount of various types of by-products. The following tabulation shows typical compositions for the cyclization product, the components being listed in the order of increasing boiling points:

|  | Percent |
| --- | --- |
| Tolylpentanes | 0.5–2 |
| Tolylpentenes | 0.5–4 |
| Methylethylindanes | 0.5–2 |
| Dimethyltetralins (other than 1,6- and 1,8-) | 0.5–4 |
| 1,6- and 1,8-dimethyltetralins | 80–97 |
| DMN's | 0.2–0.5 |
| $C_{24}$ dimers | 1–8 |

In spite of the various byproducts formed, such material can be processed under the conditions described for Zone B without rapid deactivation of the dehydrogenation catalyst when a platinum-on-alumina catalyst is employed. Particularly long catalyst lives can be achieved when the catalyst used is platinum-on-alumina which is non-acidic or has been rendered non-acidic by treatment with a solution of an alkaline salt such as lithium carbonate. Under the conditions maintained in Zone B the $C_{24}$ dimer material is converted almost entirely to $C_{12}$ products including DMN's, as previously mentioned. Furthermore the olefinic components (tolylpentenes) rapidly become saturated in Zone B and thus also do not tend to cause carbonaceous deposits that deactivate the catalyst.

Figure 2:
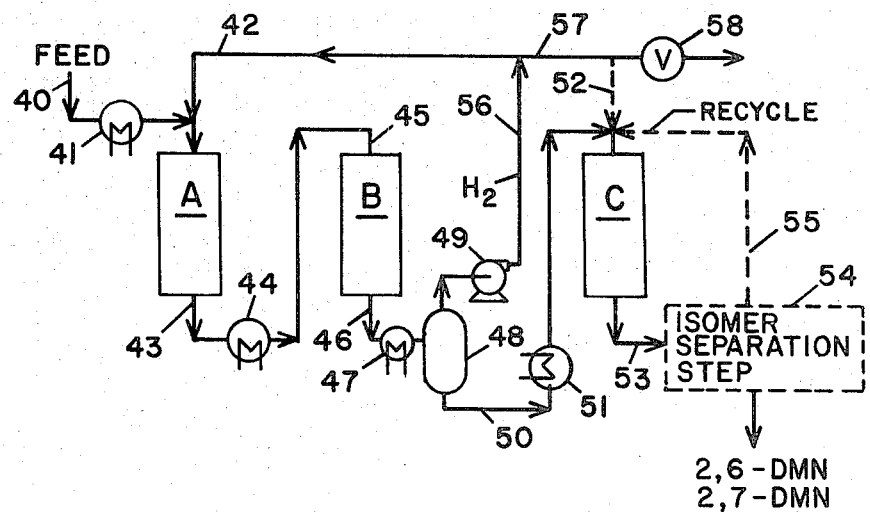

In the embodiment illustrated in FIG. 2 reaction Zones A and B are the same as the corresponding zones in FIG. 1 and they are operated with reactants in vapor phase under the same conditions utilizing the same types of catalysts. The process of FIG. 2 differs in that the product from Zone B is condensed and the hydrogen is recycled back to Zone A. The feed enters through line 40 and is vaporized in heater 41 and then introduced into Zone A where reaction occurs according to Equation I. The mixture of dimethyltetralins and hydrogen passes through line 43, heater 44 and line 45 into the top of Zone B wherein reaction occurs according to Equations II–a and II–b. The reaction mixture flows from Zone B through line 46 and condenser 47 and into gas-liquid separator 48.

The mixture of 1,6–DMN and 1,8–DMN from separator 48 passes via line 50 through temperature regulating means 51 for adjusting the temperature to whatever level is desired for reaction in Zone C. If desired, this reaction can be carried out utilizing HF or HF–BF₃ as catalyst, as described in aforesaid U.S. Pat. 3,109,036 and the J. Org. Chem. article by Suld et al. This procedure involves dissolving the DMN mixture in an inert solvent, such as n-hexane or benzene, and contacting the solution at 0–100° C. with HF or HF–BF₃ to effect the isomerization reaction. Alternatively, the isomerization in Zone C can be carried out as a vapor phase reaction in the manner described in connection with FIG. 1.

The isomerization product from Zone C flows through line 53 to an isomer separation zone, indicated at 54, from which 2,6–DMN and 2,7–DMN are removed as product. The remaining isomers optionally can be recycled through dashed line 55 to Zone C for further conversion.

The gas phase flows from the top of separator 48 into compressor 49 and then is recycled through lines 56 and 42 to cyclization Zone A. Excess hydrogen can be removed from the system via line 57 and valve 58. When the isomerization reaction of Zone C is carried out in vapor phase as described in conjunction with FIG. 1, a portion or all of this excess hydrogen from line 57 can advantageously be used in Zone C, being admitted thereto as indicated by dashed line 52. In such case means (not shown in FIG. 2) should be provided for separating the hydrogen from the isomer products obtained through line 53.

Figure 3:
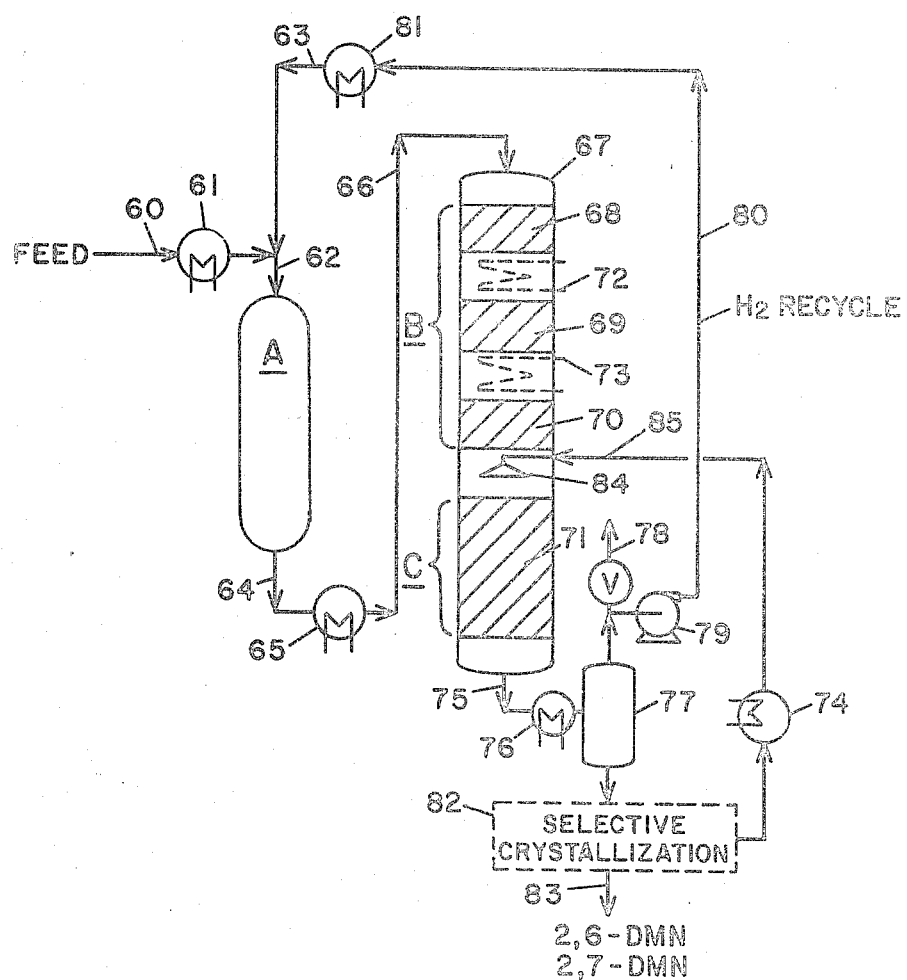
FIG. 3 is a diagrammatic illustration of a preferred manner of carrying out the process.

A preferred manner of practicing the invention is illustrated by FIG. 3. In this embodiment a single reactor column is used for reaction Zones B and C, the column being provided with dehydrogenation catalyst in the form of three superposed beds 68, 69 and 70 in its upper portion (Zone B) and a bed 71 of acidic isomerization catalyst in its lower portion (Zone C). Heating means, illustrated as coils 72 and 73, are provided between the Zone B beds to supply heat to compensate for the endothermic nature of the dehydrogenation reaction. The catalysts for Zones A, B and C are the same as described for the respective zones in FIG. 1.

The feed enters the FIG. 3 system via line 60, is vaporized in heater 61 and is introduced, together with recycled hydrogen from line 63, through line 62 to cyclization Zone A which operates under the same conditions as previously described. Preferred conditions for this reaction include a temperature of 210–250° C. and pressure of 20–200 p.s.i.g. Other conditions generally used include a liquid hourly space velocity (LHSV) of 0.1–5, preferably 0.3–2, and a hydrogen to hydrocarbon mole ratio of 0.1–10, preferably 1–5.

While the main reaction in Zone A is cyclization as depicted by Equation I, interaction between the $C_{12}$ feed molecules and the $C_{12}$ cyclization product can result in the formation of $C_{24}$ dimeric alkylation products. These high boiling products, if present in substantial amounts during the next step of the process, tend to cause progressive deactivation of the catalyst and help to shorten its life. The presence of the recycled hydrogen in Zone A is beneficial in that it minimizes the amount of these higher boiling products formed and avoids any necessity of removing them prior to the next reaction step.

The mixture from Zone A passes through line 64, heater 65, line 66 and into the top of column 67. Heat is supplied by heater 65 and coils 72 and 73 so as to maintain a temperature throughout Zone B in the range of 300–500° C. and preferably of 375–450° C. Preferably a pressure of 20–200 p.s.i.g. is maintained in this zone. Other conditions include LHSV of 0.1–10, preferably 3–7, and hydrogen to hydrocarbon mole ratio of 0.1–10, preferably 1–5. While various kinds of dehydrogenation catalysts can be used for effecting the dehydrogenation in Zone B, it is distinctly preferable to employ a platinum-on-alumina catalyst and especially non-acidic platinum-on-alumina, as this catalyst will provide an unexpectedly long life under these reaction conditions. One way of preparing such catalyst is described in aforesaid U.S. Pats. 3,255,268 and 3,325,551.

Under the conditions maintained in Zone B not only does dehydrogenation take place as shown in Equations II–a and II–b but also an unexpected benefit occurs, namely, the reconversion of $C_{24}$ dimeric alkylation material to $C_{12}$ products. This material converts partly back to dimethylnaphthalene and in part to a by-product tentatively identified as tolylpentane. This fortuitous result is beneficial in that it eliminates the presence of high boiling materials in the reaction mixture effluent from Zone B and improves the yield of desired product. The conditions in Zone B also rapidly effect hydrogenation of any olefinic bonds, converting any uncyclized tolylpentene to tolylpentane, thus avoiding any possibility of this type of component undergoing polymerization and contributing to catalyst deactivation.

The vapor mixture from the bottom of Zone B passes directly to the top of isomerization catalyst bed 71 constituting Zone C. The temperature of the mixture is regulated to the level desired for the Zone C reaction by the introduction of recycle DMN's through line 85 and sparger 84. For this purpose a heat exchanger 74 is provided in the recycle stream so that the stream temperature can be adjusted as required to secure the proper temperature in bed 71. The broad temperature range for the isomerization reaction is 275–500° C., with the preferred temperature being 325–375° C. Pressure in Zone C is determined by the pressure maintained in Zone B, and the hydrogen to hydrocarbon ratio depends upon the proportion of these components in the vapor effluent flowing from the bottom of bed 70. LHSV for Zone C falls in the range of 0.1–5 and preferably 0.5–2.

The effluent from the bottom of column 67 passes through line 75 and condenser 76 to gas-liquid separator 77. Condenser 76 is operated so as to reduce the temperature sufficiently to liquefy the dimethylnaphthalenes without causing any of the isomers to crystallize. The hydrogen phase from the top of the separator is partly vented from the system through valved line 78, and the rest is recompressed in compressor 79 and then recycled through line 80, heater 81 and lines 63 and 62 to Zone A.

While the reaction product from column 67 is composed mainly of the five DMN isomers previously listed, it also generally will contain small amounts of monomethyl- and trimethylnaphthalenes, other DMN isomers and $C_{24}$ dimeric material due to the occurrence of disproportionation and other side reactions in the preceding steps. These materials can be separated, if desired, by providing means (not shown in FIG. 3) for distilling the effluent obtained via line 75 before the 2,6- and 2,7-DMN isomers are recovered therefrom in the next step.

The hydrocarbon isomers from the bottom of separator 77 are sent to a crystallization step for selectively crystallizing the 2,6- and 2,7-isomers, which have the highest melting points of the five isomers present, as shown in the tabulation presented above in conjunction with the description of FIG. 1. For a composition as given in the tabulation, as the temperature is lowered, only 2,6–DMN will crystallize out until the temperature reaches about 30° C., at which point the eutectic of 2,6–DMN (42%) and 2,7–DMN (58%) will begin to crystallize. The temperature can be reduced to about −10 to 0° C. before the 1,5–DMN begins coming out of solution in the form of a ternary eutectic (23% 2,6-DMN, 33% 2,7–DMN and 44% 1,5–DMN). Thus by crystallizing the isomer mixture at a temperature level of about 0° C., essentially all of the 1,5–, 1,6– and 1,7–DMN's will remain in solution and about 85% of the 2,6–DMN and 70% of the 2,7–DMN can be separated in the form of crystals.

The 2,6–DMN and 2,7–DMN are separately recovered as products as indicated by line 83, while the mother liquor comprising the 1,5-, 1,6- and 1,7-isomers together with minor proportions of 2,6–DMN and 2,7–DMN is recycled through heat exchanger 74 and line 85 to isomerization Step (C). If desired the 2,6- and 2,7-isomers obtained from line 83 thereafter can be separated from each other in any suitable manner, e.g. by the procedure of aforesaid U.S. Pats. 3,590,091 and 3,594,436.

The invention thus provides an efficacious way of effecting the multistep conversion of 5-m-tolylpentene-2 to 2,6–DMN and 2,7–DMN employing a minimum of processing equipment. Once the feed has been vaporized, the reactants can flow as vapors successively through each of the conversion Zones A, B and C without any intermediate condensation, so that handling of liquids is not required until after isomerization Step (C). Hydrogen generated in Zone B can beneficially be used in Zones A and C with only one compressor being required for the entire system. The hydrogen in Zone A tends to minimize the formation of heavy material ($C_{24}$ dimeric alkylation products), and furthermore any small amount thereof that is formed advantageously becomes reconverted to lower boiling material in Zone B.

FIG. 4 illustrates an embodiment of the invention which is particularly adapted for obtaining 2,6–DMN and 2,7–DMN as separate products rather than a mixture. The FIG. 4 process can be the same as that of FIG. 2 through Steps (A) and (B) and the same numerals have been used to identify like parts up to and including the gas-liquid separator 48. The rest of the process differs from that of FIG. 2 and involves two separate isomerization steps, designated C1 and C2, for respectively isomerizing 1,6–DMN and 1,8–DMN.

With reference to FIG. 4, the liquid mixture from the bottom of separator 48, which comprises 1,6–DMN and 1,8–DMN in a ratio roughly of 2:1, passes through line 90 to isomer separation step 91. Preferably, this separation is effected by fractional distillation, as these isomers have substantially different boiling points (263° C. for 1,6–DMN v. 270° C. for 1,8–DMN). However the separation can be carried out in any other suitable way, such as by fractional crystallization and/or selective adsorption via molecular sieves.

Following separation step 91, the recovered 1,6-isomer passes through line 92, heater 93 and line 94 into the top of isomerization Zone C1. This zone can be operated under any of the isomerization conditions previously described for Step (C) of either FIG. 1 or FIG. 2. Preferably, the C1 isomerization is carried out with the hydrocarbon in vapor phase (e.g. at 330° C.) and in the presence of hydrogen supplied through dashed line 95. Equation III-a illustrates the reaction that takes place. The effluent from Zone C1 flows through line 96 and condenser 97 into gas-liquid separator 98, from which hydrogen is removed through line 99 for recycling. The condenser is operated at a temperature which liquefies the mixture without causing the 2,6–DMN to crystallize. Assuming that Step C1 has carried the isomerization to about equilibrium at 330° C., the composition or the isomerization product in separator 98 will be approximately as follows: 45% 2,6–DMN, 45% 1,6–DMN and 10% 1,5–DMN. This mixture passes through line 100 isomer separation step 101 from which the 2,6–DMN is separately recovered as indicated at 102. This separation preferably is effected by selective crystallization. Reduction of the temperature of this mixture will cause 2,6–DMN to selectively crystallize, and the temperature can be reduced to below 0° C. before the 1,5-isomer also would begin to come out of solution in the form of a eutectic of 67% 1,5–DMN and 33% 2,6–DMN. Thus by crystallizing at about 0° C., 90% of the 2,6–DMN can be selectively recovered without removing any of the other isomers from solution. The mother liquor comprising largely the 1,6-isomer together with a minor proportion of 1,5–DMN and 2,6–DMN can be recycled for further isomerization as indicated by dashed line 103.

The 1,8–DMN separately recovered from step 91 via line 104 is sent through heater 105 and line 106 to isomerizer C2 which also can be operated under any of the conditions previously described for Zone C of either FIG. 1 or FIG. 2. Preferably the C2 reaction also is carried out as a vapor phase operation with hydrogen being supplied as indicated by dashed line 107. Equation III-b illustrates the reaction that occurs. Essentially all the 1,8–DMN disappears and, assuming that equilibrium at 330° C. is reached in Zone C2, the effluent obtained therefrom via line 108 will be composed of about 55% 2,7–DMN and 45% 1,7–DMN. This material is condensed in condenser 109 at a high enough temperature to avoid crystallization of 2,7–DMN and is introduced into gas-liquid separator 110. Hydrogen is removed from the top of the separator through line 111 for recycling.

The liquid mixture of 2,7–DMN and 1,7–DMN passes through line 112 to a separation step, indicated at 113, for selectively recovering the 2,7–isomer. Preferably this is also done by crystallization. These isomers will form a eutectic mixture, composed of 7% 2,7–DMN and 93% 1,7–DMN, which crystallizes at −18° C. The temperature for this crystallization step therefore should be above −18° C. and typically will be in the range of −15° C. to 15° C. The separated 2,7–DMN is removed as indicated by line 114, while the mother liquor comprising largely the 1,7-isomer together with a minor proportion of 2,7-DMN is preferably recycled to isomerization Step C2 as indicated by dash line 115.

In further reference to FIG. 4, the streams of hydrogen recovered from the gas-liquid separators after Zones B, C1 and C2 are sent, respectively, through lines 116, 99 and 111 to line 117 and compressor 118 wherein the hydrogen is recompressed for reuse. Part of the recompressed hydrogen flows through line 42 to Zone A, while the rest goes through line 119 to lines 95 and 107 for use in isomerizers C1 and C2. Excess hydrogen is vented from the system via valve 102.

The process of FIG. 4 can be modified by carrying out the cyclization in Zone A by a liquid phase reaction, in the manner described for the modification of the FIG. 1 process. The catalyst can be a solid or liquid cyclization catalyst as described in conjunction with the FIG. 1 modification and the same conditions can be utilized. The resulting mixture of 1,6- and 1,8-dimethyltetralins is then vaporized and fed to dehydrogenation Zone B, the 1,6- and 1,8-dimethylnaphthalenes obtained are separated from each other, and the rest of the processing steps are as described for FIG. 4.

In any of the embodiments of the invention, the use of platinum-on-alumina as the dehydrogenation catalyst for the zone B reaction provides unexpected advantages in that unusually good catalyst lives can be obtained. While commercial platinum reforming catalysts can be used for this dehydrogenation reaction, it is distinctly preferable to employ platinum on non-acidic alumina. For example, in the reaction of Zone A effluent having the typical composition hereinbefore listed, in the presence of platinum on non-acidic eta or gamma alumina and hydrogen at a pressure of 150 p.s.i.g., temperature of 430° C., $H_2$ to hydrocarbon mole ratio of 10:1 and liquid hourly space velocity of 4–5, a "catalyst life" in excess of 6000 lbs. feed/lb. of catalyst can be obtained. The selectivity in conversion of the dimethyltetralins to DMN's typically will be above 95%. For the present purpose "catalyst life" is considered to be coextensive with the period during which the dimethyltetralins are converted to DMN's to an average extent of at least 90% of the equilibrium value at the temperature of operation.

By way of comparison, when the Zone B reaction is carried out under essentially the same conditions except that other catalysts such as palladium on carbon, palladium on alpha or gamma alumina or chromia on alumina are substituted for the non-acidic Pt-on-$Al_2O_3$ catalyst, "catalyst life" values of only 0 to 105 lbs./lb. of catalyst are typical.

The invention claimed is:

1. Process for converting 5-m-tolylpentene-2 to 2,6-dimethylnaphthalene and 2,7-dimethylnaphthalene which comprises:
   (A) passing a feed composed mainly of 5-m-tolylpentene-2 in vapor form over a solid acidic catalyst at a temperature in the range of 200–450° C. and a pressure of 0–500 p.s.i.g. to effect cyclization and form a mixture of 1,6-dimethyltetralin and 1,8-dimethyltetralin;
   (B) contacting the reaction product from Step (A) in vapor form with a solid dehydrogenation catalyst at a temperature in the range of 300–500° C., in the presence of hydrogen and at a pressure in the range of 0–500 p.s.i.g. to convert 1,6-dimethyltetralin to 1,6-dimethylnaphthalene and 1,8-dimethyltetralin to 1,8-dimethylnaphthalene by dehydrogenation;
   (C) contacting the resulting vapor mixture of dimethylnaphthalenes and hydrogen with a solid acidic isomerization catalyst at a temperature in the range of 275–500° C. and a pressure in the range of 0–500 p.s.i.g. to form a mixture of dimethylnaphthalenes including 2,6-dimethylnaphthalene and 2,7-dimethylnaphthalene;
   (D) separating hydrogen from the reaction product containing 2,6-dimethylnaphthalene and 2,7-dimethylnaphthalene;
   (E) and recycling separated hydrogen to a step in the process preceding Step (C).

2. Process according to claim 1 wherein said separated hydrogen is recycled to Step (A).

3. Process according to claim 1 wherein said separated hydrogen is recycled to Step (B).

4. Process according to claim 1 wherein, 2,6-dimethylnaphthalene and 2,7-dimethylnaphthalene are recovered from the reaction product from Step (C) by selective removal from other dimethylnaphthalenes.

5. Process according to claim 4 wherein said other dimethylnaphthalenes are recycled to Step (C) for isomerization to the 2,6- and 2,7-isomers.

6. Process according to claim 5 wherein Steps (B) and (C) are carried out in a single reactor column containing a bed of said dehydrogenation catalyst adjacent its inlet and and a bed of said acidic isomerization catalyst adjacent its other end, and wherein said other dimethylnaphthalenes are recycled by being introduced into the vapor stream between the respective beds.

7. Process according to claim 6 wherein said dehydrogenation catalyst comprises platinium on non-acidic alumina.

8. Process according to claim 1 wherein Step (A) is carried out at a temperature of 210–250° C. and a pressure of 20–200 p.s.i.g., the vapor reaction product therefrom is heated and reacted in Step (B) at a temperature of 375–450° C. and a pressure of 20–200 p.s.i.g., and the vapor reaction product from Step (B) is reacted in Step (C) at a temperature of 325–375° C. and a pressure of 20–200 p.s.i.g.

9. Process according to claim 1 wherein 2,6-dimethylnaphthalene and 2,7-dimethylnaphthalene are recovered from the reaction product from Step (C) by selective crystallization thereof from other dimethylnaphthalenes, and said other dimethylnaphthalenes are admixed with vapor reaction product from Step (B) to form a mixture having a temperature of 325–375° C. for isomerization in Step (C).

10. Process according to claim 1 wherein the catalyst in Step (B) comprises platinum on non-acidic alumina.

11. Process for converting 5-m-tolylpentene-2 to 2,6-dimethylnaphthalene and 2,7-dimethylnaphthalene which comprises:
   (A) passing a feed composed mainly of 5-m-tolylpentene-2- in vapor form and in admixture with recycled hydrogen hereinafter specified over a solid acidic catalyst at a temperature in the range of 200–450° C. and a pressure of 0–500 p.s.i.g. to effect cyclization and form a mixture of 1,6-dimethyltetralin and 1,8-dimethyltetralin;
   (B) contacting the resulting vapor mixture of dimethyltetralins and hydrogen with a solid dehydrogenation catalyst at a temperature in the range of 300–500° C. and a pressure in the range of 0–500 p.s.i.g. to convert 1,6-dimethyltetralin to 1,6-dimethylnaphthalene and 1,8-dimethyltetralin to 1,8 - dimethylnaphthalene by dehydrogenation;
   (C) separating hydrogen from the reaction product containing 1,6-dimethylnaphthalene and 1,8-dimethylnaphthalene;
   (D) passing separated hydrogen to Step (A) as said recycled hydrogen;
   (E) and contacting the 1,6-dimethylnaphthalene and the 1,8-dimethylnaphthalene with an acidic isomerization catalyst under isomerizing conditions to isomerize same respectively to 2,6-dimethylnaphthalene and 2,7-dimethylnaphthalene.

12. Process according to claim 11 wherein Step (A) is carried out at a temperature of 210–250° C. and a pressure of 20–200 p.s.i.g., and the vapor reaction product therefrom is heated and reacted in Step (B) at a temperature of 375–450° C. and a pressure of 20–200 p.s.i.g.

13. Process according to claim 11 wherein Step (E) is effected by contacting a mixture of 1,6-dimethylnaphthalene and 1,8-dimethylnaphthalene from Step (C) with said isomerization catalyst.

14. Process according to claim 11 wherein the 1,6-dimethylnaphthalene and 1,8 - dimethylnaphthalene from Step (C) are separately recovered from each other and Step (E) is effected by separately contacting each isomer with an acidic isomerization catalyst.

15. Process for converting 5-m-tolylpentene-2 to 2,6-dimethylnaphthalene and 2,7-dimethylnaphthalene which comprises:
(A) contacting a feed composed mainly of 5-m-tolylpentene-2 with an acidic catalyst under cyclizing conditions to effect cyclization and form a mixture of 1,6-dimethyltetralin and 1,8-dimethyltetralin;
(B) contacting the reaction product from Step (A) in vapor form with a solid dehydrogenation catalyst at a temperature in the range of 300–500° C., in the presence of hydrogen and at a pressure in the range of 0–500 p.s.i.g. to convert 1,6-dimethyltetralin to 1,6-dimethylnaphthalene and 1,8-dimethyltetralin to 1,8-dimethylnaphthalene by dehydrogenation;
(C) contacting the resulting vapor mixture of dimethylnaphthalenes and hydrogen with a solid acidic isomerization catalyst at a temperature in the range of 275–500° C. and a pressure in the range of 0–500 p.s.i.g. to form a mixture of dimethylnaphthalenes including 2,6-dimethylnaphthalene and 2,7-dimethylnaphthalene;
(D) separating hydrogen from the reaction product containing 2,6-dimethylnaphthalene and 2,7-dimethylnaphthalene;
(E) and recycliing hydrogen to Step (B).

16. Process according to claim 15 wherein 2,6-dimethylnaphthalene and 2,7-dimethylnaphthalene are recovered from the reaction product from Step (C) by selective removal from other dimethylnaphthalenes.

17. Process according to claim 16 wherein said other dimethylnaphthalenes are recycled to Step (C) for isomerization to the 2,6- and 2,7-isomers.

18. Process according to claim 17 wherein Steps (B) and (C) are carried out in a single reactor column containing a bed of said dehydrogenation catalyst adjacent its inlet end and a bed of said acidic isomerization catalyst adjacent its other end, and wherein said other dimethylnaphthalenes are recycled by being introduced into the vapor stream between the respective beds.

19. Process according to claim 16 wherein said dehydrogenation catalyst comprises platinum on non-acidic alumina.

20. In a process for converting 5-m-tolylpentene-2 to dimethylnaphthalene, the steps which comprise:
(A) converting the 5-m-tolylpentene-2 mainly to 1,6-dimethyltetralin and 1,8-dimethyltetralin by contacting same with an acidic catalyst under cyclizing conditions at which a cyclization reaction occurs to give reaction product composed mainly of said dimethyltetralins but also containing $C_{24}$ dimeric alkylation product;
(B) contacting said reaction product in vapor phase and in the presence of hydrogen with a solid dehydrogenation catalyst comprising platinum-on-alumina at a temperature of 300–500° C., whereby 1,6-dimethyltetralin and 1,8-dimethyltetralin are dehydrogenated respectively to 1,6-dimethylnaphthalene and 1,8-dimethylnaphthalene and said $C_{24}$ dimeric alkylation product is converted to $C_{12}$ products including dimethylnaphthalene;
(C) recovering hydrogen produced by the dehydrogenation reaction and recycling same in the process to Step (A) or Step (B).

21. A process according to claim 20 wherein said dehydrogenation catalyst is platinum on non-acidic alumina.

22. A process according to claim 20 wherein the catalyst in Step (A) is a solid phosphoric acid catalyst.

23. A process according to claim 20 wherein the catalyst in Step (A) is a solid phosphoric acid catalyst and the temperature is 210–250° C., and wherein the catalyst in Step (B) is platinum on non-acidic alumina and the temperature is 375–450° C.

24. Process for converting 5-m-tolylpentene-2 to 2,6-dimethylnaphthalene and 2,7-dimethylnaphthalene which comprises:
(A) contacting a feed composed mainly of 5-m-tolylpentene-2 with an acidic catalyst under cyclizing conditions to effect cyclization and form 1,6-dimethyltetralin and 1,8-dimethyltetralin;
(B) contacting the reaction product from Step (A) in vapor form with a solid dehydrogenation catalyst at a temperature in the range of 300–500° C., in the presence of hydrogen and at a pressure in the range of 0–500 p.s.i.g. to convert 1,6-dimethyltetralin to 1,6-dimethylnaphthalene and 1,8-dimethyltetralin to 1,8-dimethylnaphthalene by dehydrogenation;
(C) separately recovering the 1,6-dimethylnaphthalene and 1,8-dimethylnaphthalene;
(D) contacting the 1,6-dimethylnaphthalene with an acidic isomerization catalyst under isomerizing conditions to form an isomeric mixture comprising 2,6-, 1,5- and 1,6-dimethylnaphthalenes;
(E) selectively recovering 2,6 - dimethylnaphthalene from said isomeric mixture and recycling the other isomers to Step (D);
(F) contacting the 1,8-dimethylnaphthalene with an acidic isomerization catalyst under isomerizing conditions to form a second isomeric mixture comprising 2,7- and 1,7-dimethylnaphthalenes;
(G) selectively recovering 2,7 - dimethylnaphthalene from said second isomeric mixture and recycling the 1,7-dimethylnaphthalene to Step (F);
(H) and utilizing hydrogen produced by the dehydrogenation reaction of Step (B) in at least one of Steps (A), (D) and (F).

25. In a process in which 5-m-tolylpentene-2 is cyclized in the presence of an acidic catalyst to 1,6- and 1,8-dimethyltetralin and in which process by-product higher than $C_{12}$ is formed, the improvement which comprises subjecting said by-product to dehydrogenation conditions in the presence of a solid dehydrogenation catalyst to convert at least some of said by-product to dimethylnaphthalene.

26. Process according to claim 25 in which said by-product is a $C_{24}$.

27. Process according to claim 25 in which said dehydrogenation catalyst is platinum on non-acidic alumina.

References Cited

UNITED STATES PATENTS

| | | | |
|---|---|---|---|
| 3,244,758 | 4/1966 | Eberhardt | 260—668 B |
| 3,109,036 | 10/1963 | Suld et al. | 260—668 A |
| 3,336,411 | 8/1967 | Benham | 260—668 F |
| 3,207,801 | 9/1965 | Frilette et al. | 260—668 F |
| 3,428,698 | 2/1969 | Peterson | 260—668 F |

CURTIS R. DAVIS, Primary Examiner

U.S. Cl. X.R.

260—668 A